(12) United States Patent
Koppert et al.

(10) Patent No.: US 9,999,235 B2
(45) Date of Patent: Jun. 19, 2018

(54) READY-TO-DRINK TEA BEVERAGE COMPRISING CELLULOSE MICROFIBRILS DERIVED FROM PLANT PARENCHYMAL TISSUE

(71) Applicant: Conopco, Inc., Englewood Cliffs, NJ (US)

(72) Inventors: Remco Joannes Koppert, Woerden (NL); Krassimir Petkov Velikov, Utrecht (NL)

(73) Assignee: Conopco, Inc., Englewood Cliffs, NJ (US)

( * ) Notice: Subject to any disclaimer, the term of this patent is extended or adjusted under 35 U.S.C. 154(b) by 108 days.

(21) Appl. No.: 14/651,749

(22) PCT Filed: Dec. 2, 2013

(86) PCT No.: PCT/EP2013/075216
§ 371 (c)(1),
(2) Date: Jun. 12, 2015

(87) PCT Pub. No.: WO2014/095323
PCT Pub. Date: Jun. 26, 2014

(65) Prior Publication Data
US 2015/0335040 A1 Nov. 26, 2015

(30) Foreign Application Priority Data
Dec. 19, 2012 (EP) .................... 12198229

(51) Int. Cl.
*A23F 3/14* (2006.01)
*A23F 3/16* (2006.01)
*A23L 29/262* (2016.01)
*A23L 33/21* (2016.01)

(52) U.S. Cl.
CPC ............... *A23F 3/14* (2013.01); *A23F 3/163* (2013.01); *A23L 29/262* (2016.08); *A23L 33/21* (2016.08)

(58) Field of Classification Search
None
See application file for complete search history.

(56) References Cited

U.S. PATENT DOCUMENTS

| | | | | |
|---|---|---|---|---|
| 4,923,981 | A * | 5/1990 | Weibel | A21D 2/188 424/439 |
| 5,964,983 | A * | 10/1999 | Dinand | C09K 8/206 162/187 |
| 6,180,159 | B1 | 1/2001 | Villagran et al. | |
| 6,231,657 | B1 * | 5/2001 | Cantiani | A61K 8/027 106/162.8 |
| 6,485,767 | B1 | 11/2002 | Cantiani et al. | |
| 6,673,384 | B1 | 1/2004 | Villagran et al. | |
| 6,758,130 | B2 | 7/2004 | Sargent et al. | |
| 7,838,666 | B2 * | 11/2010 | Yaginuma | A23F 3/40 426/658 |
| 2003/0059514 | A1 | 3/2003 | Villagran et al. | |
| 2003/0228393 | A1 | 12/2003 | Zhao | |
| 2005/0084544 | A1 | 4/2005 | Ekanayake et al. | |
| 2005/0272836 | A1 * | 12/2005 | Yaginuma | A23F 3/40 524/27 |
| 2006/0034993 | A1 | 2/2006 | Saelzer | |
| 2006/0099277 | A1 | 5/2006 | Jewett, Jr. et al. | |
| 2007/0259022 | A1 | 11/2007 | Molhuizen et al. | |
| 2008/0050498 | A1 | 2/2008 | Sherwood et al. | |
| 2009/0022853 | A1 | 1/2009 | Ten Brink et al. | |
| 2009/0041914 | A1 | 2/2009 | Rosevear | |
| 2009/0061064 | A1 | 3/2009 | Konda et al. | |
| 2009/0155447 | A1 | 6/2009 | Moore et al. | |
| 2010/0047395 | A1 | 2/2010 | Zwicker et al. | |
| 2010/0222439 | A1 | 9/2010 | Chen et al. | |
| 2011/0014347 | A1 | 1/2011 | Terazawa et al. | |
| 2011/0020512 | A1 | 1/2011 | Masutake et al. | |
| 2011/0305740 | A1 | 12/2011 | Boursier et al. | |
| 2012/0142909 | A1 | 6/2012 | Lundberg | |
| 2015/0320070 | A1 | 11/2015 | Benjamin et al. | |
| 2017/0112177 | A1 * | 4/2017 | Lemmers | A23L 29/262 |

FOREIGN PATENT DOCUMENTS

| | | |
|---|---|---|
| CN | 1072297 | 5/1993 |
| CN | 1095240 | 11/1994 |
| CN | 1108759 | 9/1995 |
| CN | 100451035 | 1/2009 |
| CN | 101385563 | 3/2009 |
| CN | 101692852 | 4/2010 |
| CN | 101919459 | 12/2010 |
| CN | 101926401 | 12/2010 |
| CN | 102119754 | 7/2011 |
| CN | 102524450 | 7/2012 |
| CN | 103230052 | 8/2013 |
| CN | 103230052 A | 8/2013 |
| EP | 0295865 | 12/1988 |
| EP | 0296849 | 12/1988 |
| EP | 1553103 | 7/2005 |

(Continued)

OTHER PUBLICATIONS

Taro milk tea with five types of beans, Mintel Database GNPD, Sep. 2012.

Aguilera et al., Starch, Functional Properties, and Microstructural Characteristics in Chickpea and Lentil as Affected by Thermal Processing, Journal of Agricultural and Food Chemistry, 2009, 99. 10682-10688, 57, ES.

Coco-Cola, Sokenbicha Iced Tea, Database Mintel GDPD, Apr. 2009, pp. 1-2.

(Continued)

Primary Examiner — Tamra L. Dicus
(74) Attorney, Agent, or Firm — Greenberg Traurig, LLP

(57) ABSTRACT

The invention relates to a ready-to-drink tea beverage comprising water, tea solids, protein and primary cell wall material. The primary cell wall material is derived from plant parenchymal tissue and has been treated to contain at least partially disentangled cellulose microfibrils. The invention further relates to a method for preparing said ready-to-drink tea beverage comprising the steps of •—mixing at least part of the water and primary cell wall material; and •—subjecting this mixture to mechanical energy and/or cavitation.

18 Claims, No Drawings

(56) References Cited

FOREIGN PATENT DOCUMENTS

| EP | 2168440 | 3/2010 |
|---|---|---|
| GB | 1537011 | 12/1978 |
| IN | 01309CH2011 | 10/2012 |
| JP | 2001029053 | 2/2001 |
| JP | 2004305005 | 11/2004 |
| JP | 2005245217 | 9/2005 |
| JP | 2006020580 | 1/2006 |
| JP | 2007330256 | 12/2007 |
| JP | 2008104428 | 5/2008 |
| TW | 200944130 | 11/2009 |
| WO | WO9831240 | 7/1998 |
| WO | WO0067749 | 11/2000 |
| WO | WO0152670 | 7/2001 |
| WO | WO2009124305 | 10/2009 |
| WO | WO2010056410 | 5/2010 |
| WO | WO2011115910 | 9/2011 |
| WO | WO2012089448 | 7/2012 |

OTHER PUBLICATIONS

Harshadrai M Rawel et al, Determining the binding affinities of phenolic compounds to proteins by quenching of the intrinsic tryptophan fluorescence, Molecular Nutrition & Food Research, Aug. 1, 2006, 705-713, vol. 50 No. 8.

Koiwai Dairy, Azuki Green Tea Au Lait, Database Mintel GNPD, Jan. 2006, pp. 1-2.

Kracie Foods, Green Tea & Azuki Bean Drink, Database Mintel GNPD, Apr. 2004, pp. 1-2.

Nestle, Matcha Green Tea Latte with Rich Azuki, Database Mintel GNPD, Sep. 2011, pp. 1-2.

Sotomayor et al, Lentil Starch Content and it Microscopical Structure as Influenced by Natural Fermentation, Starch Starke, 1999, 152-156, 5, ES.

Zhen et al., Thermal processing effects on the functional properties and microstructure of lentil chickpea and pea flours, Food Research International, 2011, pp. 2534-2544; XP028270962, vol. 44, No. 8, Elsevier.

Dinand E et al, Suspensions of cellulose microfibrils from sugar beet pulp, Food Hydrocolloids, 1999, 275-283XP002251873, 13-3 (NPL 1, pp. 1-9).

Emmi Emminent, Energy Drink, Mintel GNPD, Sep. 1-2, 2008. (NPL 1, pp. 10-11).

IPRP2 in PCTEP2013075216, Mar. 27, 2015, WO (NPL 1, pp. 12-23).

Lipton, Indulgent Milk Tea, Lipton Indulgent Milk Tea 2012 PP1-2, Sep. 18, 2012, pp. 1-2, JP (NPL 1, pp. 24-25).

Nathalie Lavoine et al, Microfibrillated cellulose—Its barrier properties and applications in cellulosic materials: A review, Carbohydrate Polymers, Jun. 1, 2012, 735-764, 90 No. 2 (NPL 1, pp. 26-55).

Pokka, Roast Tea Latte, Pokka Roast Tea Latte, Sep. 10, 2012, pp. 1-2, JP (NPL 1, pp. 56-57).

Search Report in EP12198229, dated May 17, 2013 (NPL 1, pp. 58-59).

Search Report in PCTEP2013075216, dated Feb. 13, 2014 (NPL 1, pp. 60-64).

Written Opinion in PCTEP2013075216, dated Oct. 28, 2014 (NPL 1, pp. 65-72).

* cited by examiner

READY-TO-DRINK TEA BEVERAGE COMPRISING CELLULOSE MICROFIBRILS DERIVED FROM PLANT PARENCHYMAL TISSUE

FIELD OF THE INVENTION

The present invention relates to ready-to-drink tea based beverages comprising protein.

BACKGROUND OF THE INVENTION

Apart from water, tea is consumed in greater volumes than any other beverage. In the Western world most of that tea is so-called "black tea" which is obtained from the leaves of the plant *Camellia sinensis* by processes that allow polyphenols in the leaf to be oxidized by enzymes within the leaf (such as polyphenol oxidase) to produce the colored polymeric materials that are responsible for the characteristic color of black teas and of the infusions made from them.

In seventeenth century England, when tea was a luxury and taken in porcelain cups, tea drinkers were concerned that pouring hot tea directly on to the delicate cup would cause it to crack, so they began to add a small amount of milk first. In many countries, consumers still prefer to add milk to black tea before consumption. Such milked tea or milk tea beverage can be served either hot or cold. Many consumers prefer teas that are ready-to-drink, i.e. that are pre-prepared and sold in bottles or other packaging.

Ready-to-drink (RTD) milk tea beverages usually contain milk solids like for example milk protein and milk fat that give the beverages certain organoleptic properties like for example a 'creamy mouthfeel'. Some consumers perceive animal fat like milk fat as less desirable. To accommodate such concerns, milk fat is sometimes replaced in part or in whole by vegetable fat. This can be achieved by using for example non-dairy creamers (NDC) instead of milk powder. A typical NDC usually contains vegetable fat and, despite the name, milk proteins like for example sodium caseinate. The NDC may further comprise sugars like lactose.

Some consumers want to lower their caloric intake for health reasons and prefer products that have a low(er) caloric value (i.e. are less energy dense). The amount of milk solids and/or NDC can be lowered to lower the caloric value of ready-to-drink milk tea beverages. However, this may lead to a loss of some or a deterioration of organoleptic properties that consumers associate with a ready-to-drink milk tea beverage, and is therefore less desirable.

Microfibrillar cellulose (a.k.a. cellulose microfibrils) is a product that is well known and used in many fields such as the food sector. It gives the media in which it is present specific properties in terms of for example viscosity and stability. For example, EP 295 865 describes the use of cellulose microfibril suspensions containing parenchymal cells as an additive for food formulations.

Milk containing beverages may suffer from stability problems in that fat and oil droplets surfacing on the upper surface of the beverage. This is sometimes called 'creaming'. Other stability problems that may be encountered upon storage include sedimentation. Such stability problems may make the milk containing beverage less appealing for consumers.

JP 2004-305005A describes the use of fibrous cellulose to provide a stable milk component containing beverage. More specifically the use of fibrous cellulose from secondary cell wall material is described.

JP 2007-330256 describes the use of fermented cellulose as a stabilizer in a beverage containing a milk component. More specifically the use of bacterial cellulose is described.

There is thus a need for RTD milk tea beverages that provide an acceptable organoleptic experience expected of such beverages, like for example creaminess, while being low(er) in energy content. There is also a need for alternative RTD milk tea beverages that can provide new sensorial experiences. Such beverages preferably should be stable and not suffer from for example 'creaming' and/or sedimentation upon storage.

SUMMARY OF THE INVENTION

We have found that defibrillated primary cell wall material allows for a RTD milk tea beverage that has acceptable organoleptic properties and is stable upon storage. We have further found that defibrillated cell wall material from other sources like secondary cell wall material or bacterial cell wall material does not provide acceptable organoleptic properties and/or stability.

Accordingly the present invention relates to a ready-to-drink tea beverage comprising water, tea solids, protein and primary cell wall material comprising cellulose microfibrils; wherein the primary cell wall material is sourced from plant parenchymal tissue, and, wherein
- the beverage has a pH of 5 to 7.5;
- at least part of the protein is milk protein;
- the primary cell wall material comprises defibrillated cell wall material;
- the cellulose microfibrils have an average degree of crystallinity of less than 50%;
- at least 80 wt % of the cellulose microfibrils is smaller than 50 nm in diameter;
- the defibrillated cell wall material has a self-suspending capacity from 50 to 100% at 0.3 wt %; and
- the beverage has a G' from 0.01 Pa to 10 kPa at 20 degrees Celsius.

The invention further relates to a method for preparing the ready-to-drink tea beverage according to invention comprising the steps of
- mixing at least part of the water and primary cell wall material; and
- subjecting this mixture to mechanical energy and/or cavitation.

DETAILED DESCRIPTION OF THE INVENTION

Weight percentage (wt %) is calculated on the total weight of the composition unless otherwise stated. For the avoidance of doubt any, any feature of one aspect of the present invention may be utilized in any other aspect of the invention. The word "comprising" is intended to mean "including" but not necessarily "consisting of" or "composed of". In other words, the listed steps or options need not be exhaustive. It is noted that the examples given in the description below are intended to clarify the invention and are not intended to limit the invention to those examples per se. Except in the operating and comparative examples, or where otherwise explicitly indicated, all numbers in this description and claims indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

RTD Tea Beverage

The term "ready-to-drink tea beverage" refers to a packaged tea-based beverage, i.e. a substantially aqueous drinkable composition suitable for human consumption. Preferably the beverage comprises at least 85% water by weight of the beverage, more preferably at least 90%.

Preferably the beverage is substantially free of preservative and/or added artificial flavors and/or artificial aromas and/or artificial colors, i.e. the beverage contains less than about 0.05 wt % on total weight of the beverage composition, and preferably, from about 0.001 to about 0.04 wt %, and most preferably, no preservative, added artificial flavors, aromas or colors. By "added" is meant things which do not originate from the leaves of the plant *Camellia sinensis*. Artificial flavors and artificial aromas are not meant to include ingredients used primarily for sweetening purposes.

The beverage of the invention is a milk protein containing tea beverage. This is also known as a "milk tea (beverage)". Milk tea is comprised of primarily water, milk protein, tea solids and optionally sweeteners and/or fat. Preferably the tea ingredient is derived from tea powder or tea leaf. Preferably the sweetener is derived from sugar, artificial sweetener or natural sweetener ingredients. The beverage has a pH of 5 to 7.5, preferably 5.5 to 7.5, more preferably 6 to 7.5 and even more preferably around 7.

The beverage of the invention has an elastic modulus (G') from 0.01 Pa to 10 kPa at 20 degrees Celsius. Preferably the beverage has a G' at 20 degrees Celsius from 0.01 Pa to 10 kPa, more preferably from 0.5 Pa to 1 kPa, and even more preferably from 1 Pa to 100 Pa.

For beverages that are relatively thick or more viscous it is desirable that they be shear thinning, i.e., that the viscosity becomes lower in the throat during swallowing than is experienced at the lower shear rates in the mouth. Viscous beverages that are not shear thinning are either slimy (Szczesniak and Farkas, J. Food Sci. 27, 381 (1962)) or quickly satisfy.

Preferably the ready-to-drink tea based beverage is a shear thinning product having a ratio of low shear rate viscosity measured at 1 $s^{-1}$ to pouring viscosity measured at 50 $s^{-1}$ of from 2 to 2000 at 20 degrees Celsius, more preferably from 2 to 1000, even more preferably from 3 to 500 and still more preferably from 4 to 200.

Tea Solids

The beverage preferably comprises at least 0.01 wt % tea solids on total weight of the beverage. More preferably the beverage comprises from 0.04 to 3 wt % tea solids, even more preferably from 0.06 to 2%, still more preferably from 0.08 to 1 wt % and still even more preferably from 0.1 to 0.5 wt %.

The tea solids may be black tea solids, green tea solids or a combination thereof. The term "tea solids" refers to dry material extractable from the leaves and/or stem of the plant *Camellia sinensis* var. *sinensis* and/or *Camellia sinensis* var. *assamica*. Black is distinguished from green tea, in which the leaves are substantially unfermented and oolong tea, in which the leaves have been partially fermented. Examples of tea solids include polyphenols, caffeine and amino acids. The tea solids used in the beverage of the invention comprise polyphenols, preferably in an amount of at least 10 wt %, more preferably at least 25 wt %, even more preferably at least 30 wt % and still more preferably at least 40 wt %.

Although the beverage may comprise unfermented tea solids (i.e. green tea solids), alone or in combination with black tea solids, it is preferable that the majority of tea solids are black tea solids as black tea is the type of tea which tastes the best when combined with protein, such as milk protein. More preferably at least 75 wt % of the tea solids present in the product are black tea solids, most preferably from 80 to 100 wt % of the tea solids are black tea solids.

It is well known that formulation of polyphenols, including larger molecular weight polyphenols such as tannins, in food products is difficult due to their interaction with e.g. other biopolymers. See for example K. J. Siebert *J. Agric. Food Chem.*, 47, 2, 1999. This phenomenon seems to be driven by hydrophobic interactions between carbon ring containing groups (e.g. sugars, proline) and groups containing hydroxyl (OH), amino or other groups capable of formation of strong hydrogen bonds with OH groups in the polyphenols. These interactions may lead to for example haze formation, aggregation and precipitation which may render the food product unstable.

Protein

The beverage of the invention comprises protein. At least part of the protein is milk protein. Preferably the amount of protein is from 0.1 to 10 wt %, more preferably from 0.2 to 7 wt % and even more preferably from 0.25 to 4 wt %.

The preferred proteins are milk proteins such as whey proteins and/or caseins. Preferably at least 50 wt % of the protein is milk protein, more preferably at least 70 wt %, even more preferably at least 90 wt % and still more preferably the protein consists essentially of milk protein. Suitable sources of milk protein include, for example, whole milk powder, skimmed milk powder, whey protein concentrate, whey protein isolate, caseinate powder, non-dairy creamer powders, and mixtures thereof.

Non-dairy proteins may also be used in addition to milk proteins. For example, the protein may comprise soy protein.

Primary Cell Wall Material

For the purpose of the invention "primary cell wall material" is defined as the cell wall material from which essentially all cold water soluble components have been removed, i.e. at a temperature of around 20 degrees Celsius. This can easily be achieved by washing with water.

The primary cell wall material is sourced (i.e. prepared) from plant parenchymal tissue. The cellulose microfibrils in the beverage according to the invention are cellulose microfibrils obtained from primary cell wall material. Such characteristics are present with cellulose based on plant parenchymal cells. The source of the plant parenchyma cells may be any plant that contains plant parenchyma cells having a cellulose skeleton. A plant cell wall contains cellulose and hemicellulose, pectin and in many cases lignin. This contrasts with the cell walls of fungi (which are made of chitin), and of bacteria, which are made of peptidoglycan. Primary plant cell walls contain lignin only in minor amounts, if at all. The primary cell wall material used in the beverage according to the invention may comprise some lignin, like less than 10 wt % calculated on total amount of cell wall material, but preferably does not contain substantial amounts of lignified tissue. Preferably the primary cell wall material consists essentially of non-lignified tissue as understood by the skilled person in the area of plant biology.

Preferably the source of primary cell wall material is selected from parenchymal tissue from fruits, roots, bulbs, tubers, seeds and combination thereof; more preferably is selected from citrus fruit, tomato fruit, peach fruit, pumpkin fruit, kiwi fruit, apple fruit, mango fruit, sugar beet, beet root, turnip, parsnip, maize, oat, wheat, peas and combinations thereof; and even more preferably is selected from citrus fruit, tomato fruit and combinations thereof. A most preferred source of primary cell wall material is parenchymal tissue from citrus fruit.

Preferably the amount of cell wall material in the beverage according to the invention is from 0.01 to 2 wt %, more preferably from 0.05 to 0.8 wt % and even more preferably from 0.1 to 0.7 wt %, based on dry weight of the primary cell wall material from which essentially all cold water soluble components have been removed (i.e. the insoluble fraction).

Preferably, the cellulose microfibrils are obtained from the primary cell wall material by removing soluble and unbound sugars, protein, polysaccharides, oil soluble oils, waxes and phytochemicals (e.g. carotenoids, lycopene). This is suitably achieved using well known techniques including cutting up the cell wall material, cooking, washing, centrifugation, decanting and drying as illustrated at the example section.

Preferably the primary cell wall material comprises at least 50 wt % of cellulose microfibrils, more preferably at least 60 wt %, even more preferably at least 70 wt %, still more preferably at least 80 wt %, even still more preferably at least 90 wt % and most preferably the primary cell wall material consists essentially of cellulose microfibrils.

Although plant cell walls contain hemicelluloses and pectin in addition to cellulose, the primary cell wall material of the invention does not necessarily contain hemicellulose and/or pectin.

The hemicellulose or part thereof may have been removed when the primary cell wall material is prepared from the plant parenchymal tissue. Therefore, the primary cell wall material of the invention optionally comprises hemicellulose, like for example in an amount of 0 to 40 wt %. Preferably the primary cell wall material comprises hemicelluloses, preferably in an amount of up to 40 wt %, like for example from 5 to 40 wt %, and more preferably in an amount from 10 to 30 wt %.

Likewise the pectin or part thereof may have been removed when the primary cell wall material is prepared from the plant parenchymal tissue. Therefore, the primary cell wall material of the invention optionally comprises pectin, like for example in an amount of 0 to 30 wt %. Preferably the primary cell wall material comprises pectin, preferably in an amount of up to 30 wt %, like for example from 5 to 30 wt %, and more preferably in an amount from 10 to 20 wt %.

Preferably the primary cell wall material of the invention comprises hemicelluloses and pectin.

Cellulose Microfibrils

The cellulose microfibrils in the primary cell wall material should have an average degree of crystallinity of less than 50%. Cellulose microfibrils with a higher average degree of crystallinity are not used as this may not result in the surprisingly found stable ready-to drink tea beverage of the invention. Preferably the average degree of crystallinity of the cellulose microfibrils is less than 40%, more preferably less than 35% and even more preferably less than 30%. The average degree of crystallinity can be suitably determined according to the method described at the example section.

The table below shows the average degree of crystallinity of typical sources of cellulose microfibrils.

TABLE 1

Average degree of crystallinity of cellulose (all polymorph cellulose I)

| Source | Average degree of crystallinity (%) |
| --- | --- |
| Tomato fibers | 32 |
| Citrus fiber (Citrus Fiber AQ + N) | 29 |
| Nata de Coco | 74 |

TABLE 1-continued

Average degree of crystallinity of cellulose (all polymorph cellulose I)

| Source | Average degree of crystallinity (%) |
| --- | --- |
| Cotton | 72 |
| Wood pulp fiber (Meadwestvaco) | 61 |
| Sugar beet fibre (Nordix Fibrex) | 21 |
| Pea fibres (PF200vitacel) | 42 |
| Oat fibres (780 Sunopta) | 43 |
| Corn hull (Z-trim) | 48 |
| Sugar cane Fiber (Ultracel) | 49 |

Cellulose microfibrils can be of diverse origin, for example of plant, bacterial, animal, fungal or amoebic origin. Cellulose microfibrils are usually strongly self-associated in the cell walls or the fibers. Secondary cell walls, which are mainly found in wood, are distinct from primary cell walls, a typical example of the latter are parenchymal cell walls. In the secondary cell walls, these microfibrils are organized in the form of highly oriented sheets thus forming an in-dissociable fiber. They are conventionally in the form of aggregates from a few tens of nanometers to a few micrometers. These aggregates consist of elementary microfibrils which may not be easily disentangled during the homogenization without breaking.

The primary cell wall material in the beverage of the invention comprises defibrillated cell wall material, i.e. the cellulose microfibrils that make up the fibers present in the primary cell wall are at least partially disentangled without breaking them. It has been found that such defibrillated primary cell wall material when used in a ready-to-drink beverage result in a beverage with acceptable organoleptic properties and that is stable upon storage.

Preferably the average length of the cellulose microfibrils from the defibrillated primary cell wall material is more than 1 micrometer and preferably more than 5 micrometers.

At least 80 wt % of the cellulose microfibrils is smaller than 50 nm in diameter. The diameter thereof can be suitably determined using the method described at the example section. Preferably at least 80 wt % of the cellulose microfibrils is smaller than 40 nm in diameter, more preferably smaller than 30 nm, even more preferably smaller than 20 nm and still more preferably smaller than 10 nm.

The primary cell wall material is suitably defibrillated by subjecting it to mechanical energy and/or cavitation thereby disentangling the cellulose microfibrils. This can be done as part of obtaining the cellulose microfibrils from the primary cell wall material, thus resulting in isolated defibrillated cell wall material comprising cellulose microfibrils. Alternatively, the primary cell wall material can be combined with one or more of the other ingredients of the ready-to-drink beverage wherein the resulting mixture is subjected to mechanical energy and/or cavitation thereby disentangling the cellulose microfibrils in the cellulose fibers.

Self-Suspending Capacity

It has been found that defibrillation of the primary cell wall material results in material with improved properties suitably employed in the beverage of the present invention. The resulting material can be characterized by determining the "self-suspending capacity" thereof using the following protocol.

0.3 g cell wall material (calculated as dry weight) was added to 50 ml of water in a 100 ml graduated measuring cylinder with a diameter of 2.5 cm. The pH of the suspension was measured and adjusted to pH 4.2 if needed using aqueous acetic acid, after which the cylinder was filled to 100 ml. The cylinder was gently turned up and down for 10 times to ensure a proper wetting of the cell wall material. After 24 hours at room temperature the volume occupied by the cell wall material suspension was determined and expressed as a percentage of total volume. For example, if the volume occupied by the cell wall material suspension is 80 ml, this is expressed as a self-suspending capacity of 80%.

The dry weight of the cell wall material, as used above, was determined by drying 6.00 g of the cell wall material in an oven at 120° C. during 1 hr and determining the weight of the resulting dried material. Dry weight=100%*(weight after drying (g)/6 (g)).

If the self-suspending capacity is determined to be 100%, the protocol is repeated using 0.2 g cell wall material (calculated as dry weight). If the self-suspending capacity is still 100% the protocol is repeated using 0.1 g cell wall material (calculated as dry weight).

Defibrillated cell wall material used in the beverage according to the invention has a self-suspending capacity from 50 to 100% at 0.3 wt %. Preferably the defibrillated cell wall material has a self-suspending capacity from 80 to 100% at 0.3 wt %, more preferably from 80 to 100% at 0.2 wt % and even more preferably from 80 to 100% at 0.1 wt %.

Fat

The beverage of the invention may optionally comprise fat, which may help in masking bitterness caused by high caffeine levels and/or aid in obtaining the desired mouthfeel like e.g. a creamy mouthfeel. Preferably the amount of fat is from 0 to 20 wt % and more preferably from 0.1 to 10 wt %. Preferably, however, the amount of fat is not too high as otherwise the product may become too high in calories and/or the desired taste of tea may be masked. Therefore the amount of fat is even more preferably from 0.2 to 5 wt %, and still more preferably from 0.3 to 2 wt %.

Conveniently the fat may be milk fat, as then the fat and protein may be added as part of a single composition. For example, the product may comprise milk powder and at least part of the fat and at least part of the protein may be derived from the milk powder.

The fat may also be a combination of milk fat and vegetable fat, or when desired, consists essentially of vegetable fat. The fat, when present in the beverage of the invention, is thus selected from milk fat, vegetable fat and combinations thereof.

Non-dairy creamers may provide at least part of the protein in the beverage of the invention and typically, although such non-dairy creamers comprise milk proteins, any fat used therein is non-dairy fat such as vegetable fat.

It is most preferred that at least part of the fat is present in the product as emulsified particles. By "emulsified particles" is meant that the fat is dispersed or dispersible in water to form an emulsion of the particles in the water. Conveniently, at least part of the protein will coat the emulsified fat particles in order to allow dispersion of the fat particles in water, i.e. at least part of the protein will be present in the product as an emulsifier for the fat particles.

Hydrocolloids

The beverage of the invention may further comprise hydrocolloids to aid in obtaining the desired viscosity of the beverage. Such hydrocolloids may include hydrocolloids selected from gums, polysaccharides, gelatin and glycoproteins. Preferably the hydrocolloid comprises a hydrocolloid selected from pectin, hemicelluloses, modified celluloses, sodium alginate, guar, beta-glucan, tara gum, carrageenan, gum Arabic, locust bean gum, gelatin, starch, modified starch, xanthan gum and mixtures thereof.

It should be understood that the hydrocolloid is in addition to the components introduced as part of the primary cell wall material.

Preferably the beverage comprising from 0.005 to 1 wt % hydrocolloid, more preferably from 0.01 to 0.8 wt %, even more preferably from 0.05 to 0.5 wt %, and still more preferably from 0.1 to 0.3 wt %.

If present, it may be beneficial that at least part of the pectin present in the total composition is bound to the cellulose microfibrils. Some available primary cell wall material may comprise such bound pectin and the presence thereof may aid the performance of the primary cell wall material. Preferably at least 50 wt % of the pectin present is bound to the cellulose microfibrils, more preferably at least 80 wt %, even more preferably at least 90 wt % and still more preferably essentially all of the pectin present is bound to the cellulose microfibrils.

Sweeteners

The beverage of the invention may optionally comprise sweeteners, which may help in masking bitterness caused by high caffeine levels. For example, the beverage may comprise from 0.01 to 6 wt % of sweeteners. Preferably the sweetener is derived from sugar, artificial sweetener and natural sweetener. Preferably the sweetener is a sugar selected from sucrose, lactose, glucose, fructose and combinations thereof.

Preferably, however, the amount of sweetener is not too high as otherwise the beverage may become too high in calories and/or the desired taste of tea may be masked. Thus it is preferred that the amount of sweetener is from 0.05 to 4 wt % and more preferably from 0.1 to 2 wt %.

Many milk powders and non-dairy creamers contain sugars. For example, milk contains lactose. Thus in one embodiment the one or more sugars in the beverage comprise lactose. Alternatively the product may be suitable for consumers who are lactose intolerant. Thus in another embodiment the beverage is substantially free from lactose.

Form of the Product

The beverage can be packaged, preferably in a bottle or can. The volume of the packaged beverage may be such that it may be consumed in a single serving, for example less than 1 L, preferably from 100 to 600 mL. Alternatively the package may contain several servings, so that it has a volume of typically 2 L.

Sterilization may be desired to kill the microbes present in the beverage, so that once packaged; the beverage is microbiologically stable and has a suitable shelf life. Sterilization is typically achieved by applying heat. The "F0" value, which expresses the heating time required for sterilization, is often used as a benchmark for the sterilization time. The sterilization time/F0 value required depend on the formulation (e.g. pH, sugar content, milk solids content). An F0 value in the range of 30 to 40 is typically suitable for the present invention. Sterilization of the beverage may take place before or after packaging.

Sterilization processes can affect the aroma and flavor of the tea product. Moreover, the flavor can deteriorate when the tea is stored, especially at elevated temperatures. In particular, ready-to-drink milk tea suffers from this problem because of the presence of milk. Thus flavors are often added to ready-to-drink teas in order to counteract this. The use of added flavors however, can discourage consumers from consuming tea since this takes away from the natural, healthy image of the product. It is therefore desirable to produce a ready-to-drink tea product that has flavor, stability and color attributes consistent with those found in tea made by leaf infusion while at the same time being free of added flavors.

Method for Preparing a Ready-To-Drink Tea Beverage

The invention further relates to a method for preparing the ready-to-drink tea beverage according to the invention comprising the steps of
- mixing at least part of the water and primary cell wall material; and
- subjecting this mixture to mechanical energy and/or cavitation.

Preferably the mixture of at least part of the water and primary cell wall material is subjected to mechanical energy by at least one pass through a high pressure homogenizer at a pressure of at least 200 bar, more preferably at least 500 bar, even more preferably at least 700 bar and still even more preferably at least 1000 bar.

The mixing of the water and primary cell wall material may also include part or all of the other ingredients of the ready-to-drink tea beverage. In this case all the ingredients are first mixed before being subjected to mechanical energy and/or cavitation The invention further relates to the ready-to-drink tea beverage according to the invention obtainable by the method of the invention for preparing the same.

The invention is now illustrated by the following non-limiting examples.

Examples

Degree of Crystallinity of Cellulose Microfibrils

Wide angle X-ray scattering (WAXS) is used to determine the degree of crystallinity, using the following protocol. The measurements were performed on a Bruker D8 Discover X-ray diffractometer with GADDS (General Area Detector Diffraction System) (From Bruker-AXS, Delft, NL) (Part No: 882-014900 Serial No: 02-826) in a theta/theta configuration. A copper anode was used, and the K-alpha radiation with wavelength 0.15418 nm was selected.

The instrumental parameters as used are shown in the table below.

TABLE 2

D8 Discover instrumental parameters for WAXS measurements

| | 2θ (9-42°) |
|---|---|
| Theta 1 | 10.000 |
| Theta 2 | 10.000/25.000 |
| Detector Bias (kV/mA) | 40/40 |
| Time (sec) | 300 |
| Collimator (mm) | 0.3 |
| Detector distance (cm) | 25 |
| Tube Anode | Cu |

The degree of crystallinity was calculated from the following equation:

$$Xc(\%) = \frac{\text{Area crystalline phase}}{\text{Area crystalline} + \text{amorphous phase}} * 100\%$$

The areas of the diffraction lines of the crystalline phase were separated from the area of the amorphous phase by using the Bruker EVA software (version 12.0).

Diameter Cellulose Microfibrils

Transmission electron microscopy (TEM) was used to directly determine the diameter of the cellulose microfibrils (D. Harris et. al. Tools for Cellulose Analysis in Plant Cell Walls Plant Physiology, 2010(153), 420). The dispersion of plant source rich in primary cell wall material was diluted in distilled water resulting in a thin layer of mostly single fibers or single clusters of fibers. The dispersions were imaged on a Carbon only 300 mesh Copper TEM grid (Agar Scientific) and imaged in the Tecnai 20 Transmission electron microscope (FEI Company). To enhance image contrast between individual microfibrils, a 2% phosphotungstic acid solution at pH 5.2 was used as a negative stain. For this the fiber-loaded TEM grids were incubated on 2% phosphotungstic acid and air-dried after removal of the excess of fluid. The specimen was imaged at 200 kV.

Elastic Modulus (G')

The visco-elastic properties of the products were characterized by rheological measurements. A controlled stress rheometer (TA-AR 2000ex) from TA instruments fitted with sandblasted plate geometry (sandblasted plate diameter 40 mm, gap 1 mm) and with a sandblasted bottom plate was used to measure viscoelastic moduli (G'). Samples were added using a spoon. The measurements were done at 20 degrees Celsius and 35 degrees Celsius. G' was measured for 5 minutes at a frequency of 1 Hz and a strain of 0.1%.

Stability Test

To test the stability of milk tea beverages an accelerated stability test was used according to the following protocol. A sample of 40 g was added to a 50 ml conical tube (Falcon, type 352070). The sample was subsequently subjected to centrifugation using a Biofuge Heraeus Primo R from Thermo Scientific for 15 min at 2000 rpm (relative centrifugal force=644). Based on visual observations it was determined if the sample was stable or not stable. Stable (Y): when the sample looks homogeneous and no clear formation of a second phase is observed. Not stable (N): when the sample is inhomogeneous with a clear formation of a second phase. Next, the sample was subjected to a second centrifugation step at 4000 rpm (relative centrifugal force=2576) for 15 minutes. The supernatant was decanted and the amount (grams or ml) of sediment (wet pellet), if present, was measured.

A higher amount of sediment indicates lower stability. A lower amount of sediment indicates higher stability. Samples having sediment measured in the form of wet pellets of more than 5 wt % of the total sample weight at 0.2 wt % fiber content were considered unstable. For samples containing 0.5 wt % fiber content, a sample was considered stable when no visible phase separation (i.e. formation of a second phase) was observed.

Centrifugation Force

The centrifugation force is given as a dimensional "relative centrifugal force", which is defined as $r\omega^2/g$, where $g=9.8$ m/s$^2$ is the Earth's gravitational acceleration, r is the rotational radius of the centrifuge, $\omega$ is the angular velocity in radians per unit time. The angular velocity is $\omega = \text{rpm} \times 2\pi/60$, where rpm is the centrifuge "revolutions per minute".

Creaminess Evaluation

The milk tea products were directly compared using a 1 to 1, sample to sample set-up. Two samples were presented to a panel member and the panel member was asked which of these two products was the creamiest.

Determination of Dry Weight of Primary Cell Wall Material

The dry weight plant cell wall material, corresponding to the insoluble fibre fraction, was determined by using centrifugation and dry weight determination. Typically, the dispersion containing plant cell wall material was first centrifuged for 60 min at 4250 relative centrifugal force. The obtained pellets were re-dispersed into a 800 g dispersion (total weight) using demineralized water at room temperature. Next, the dispersion was centrifuged for 30 min at 4250 relative centrifugal force. The obtained pellets were re-dispersed into a 800 g dispersion (total weight) using demineralized water and centrifuged again for 20 min at 4250 relative centrifugal force.

The dry weight of the obtained pellet determined as in insoluble fibre fraction was measured using an infrared oven scale (Mettler Toledo HB43-S) at 120° C. operated according to manufacturer's instructions.

Preparation of Primary Cell Wall Material

Primary cell wall material was obtained or prepared as in the Table below.

TABLE 3A

Sources of primary cell wall material, secondary cell wall material and bacterial cellulose.

| Source | Brand name | Supplier |
| --- | --- | --- |
| Citrus fiber (powder) | Citrus fiber AQ + N | Herbafood Ingredients GmbH |
| Tomato fiber (dispersion) | n.a. | Prepared as described |
| Mango puree (dispersion) | n.a. | Prepared as described |
| Mango fiber (dispersion) | n.a. | Prepared as described |
| Sugar cane fiber (powder) | UltraCel ™ | Watson Inc |
| Wood pulp fiber (dispersion) | n.a. | Meadwestvaco |
| Wood pulp fiber 2 (powder) | JELUCEL PF 30 | JELU-WERK Josef Ehrler GmbH & Co. KG |
| Bacterial cellulose fiber (dispersion) | Nata de Coco | Sari Kelapa Murui |

The composition of the primary cell wall material, secondary cell wall material and bacterial cellulose were determined to be as in the Table below.

TABLE 3B

Composition of primary cell wall material and bacterial cellulose

| Source | Insoluble fibre fraction (%) | Cellulose in insoluble fibre fraction (%) | Hemicelluloses in insoluble fibre fraction (%) | Pectin in insoluble fibre fraction (%) | Other (moisture) in insoluble fibre fraction (%) |
| --- | --- | --- | --- | --- | --- |
| Citrus fiber (powder) | >93* | 50 | 15-20 | 10-15 | ~7 (moisture) |
| Tomato fiber (dispersion) | 3.4 | 50 | 15-20 | 10-15 | ND |
| Mango puree (dispersion) | 1.0** | ND | ND | ND | ND |
| Mango fiber (dispersion) | 4.9 | ND | ND | ND | ND |
| Sugar cane fiber (powder) | 95* | 95 | 0 | 0 | 8 ± 3 (moisture) |
| Wood pulp fiber (dispersion) | 3.0* | >95 | 0 | 0 | ND |
| Wood pulp fiber 2 (powder) | >95* | >95 | 0 | 0 | ~7.7 |
| Bacterial cellulose dispersion | 6.2 | >95 | 0 | 0 | ND |

*as provided by the supplier;
**estimated from literature data (P. Ramulu, P. Udayasekhara Rao/Journal of Food Composition and Analysis 16 (2003) 677-685);
ND—not determined.

Preparation of Tomato Fibers as a Source of Primary Cell Wall Material

To 160.0 grams of a Hotbreak tomato paste, 28-30% Brix (Agraz, S.A.U.) 640 grams water was added to a total of 800 grams. Mixture was stirred for 3 minutes using a hand blender (Braun 300 W household type 418554). Next the suspension was centrifuged (2 batches in a Beckman Avanti J-25, rotor Ja10) for 60 min at 4250 relative centrifugal force and 20 degrees Celsius. Supernatant was carefully decanted from the sediment. Combined pellets (sediment) were redispersed into a 800 g dispersion (total weight) using demineralized water and stirred with the handblender for 3 minutes and centrifuged for 30 min at 4250 relative centrifugal force. Next supernatant was carefully decanted from the sediment. Combined pellets (sediment) were redispersed into a 800 g dispersion (total weight) using demineralized water and stirred with the handblender for 3 minutes and centrifuged for 20 min at 4250 relative centrifugal force. Finally the supernatant was carefully decanted from the sediment and the dry weight of the combined pellets was determined at 3.38 wt % as insoluble fibre fraction using an infra red oven balance (Mettler Toledo HB43-S). The self suspending capacity of the resulting material at 0.3 wt % was 72%.

39.5 grams of the tomato fiber was added to 560.5 grams of demineralized water and mixed using a handblender for 1 minute. Next the mixture was homogenized (Niro-Soavi NS2002H) at 150 bar (100 bar first stage and 50 bar second stage). This final mixture was used as tomato fiber source for the preparation of milk tea products. The self suspending capacity of the resulting material at 0.3 wt % was 100%.

Preparation of a Mango Fiber as Source of Primary Cell Wall Material

The peels and kernels were removed from Mango fruit (total weight 1035.4 g). The Mango was then cut in pieces of approx. 1×1×1 cm (total weight 722.5 g). Next, the Mango parts were cooked for 30 minutes (using induction pans cooking) using stirring with a spoon until Mango parts were broken into a smooth product with final weight of 570.2 g. Care was taken not to cook the mixture to dryness. Demineralized water (Barnstead, Nanopure Diamond) (152.3 g) was added to the cooked pulp to compensate for evaporation losses. The mango pulp was centrifuged (in 2 batches, Beckman Avanti J-25, rotor Ja10) for 75 min at 4250 relative centrifugal force and 20 degrees Celsius (wash 1). After the first centrifugation step, combined pellets (sediment) from the two batches were re-dispersed into a 800 g dispersion (total weight) using demineralized water (wash 2). Next, the dispersion was centrifuged for 30 min at 4250 relative centrifugal force. The obtained pellets were re-dispersed into a 800 g dispersion (total weight) using demineralized water and centrifuged again for 20 min at 4250 relative centrifugal force (wash 3). The dry weight of the obtained pellet of as insoluble fibre fraction was measured to be 4.90% by using an infrared oven balance. The pellet was used as Mango fiber source for the preparation of milk tea products. The self suspending capacity of the resulting material at 0.3 wt % was 63%.

Preparation of a Mango Puree as Source of Primary Cell Wall Material

The peels and kernels of the mango's were removed and the mango's were cut into small pieces of approximately 1×1×1 cm. Next the mango pieces were cut for 4 minutes using a kitchen hand blender (Braun 300 W household type 418554) into a puree. The puree was milled in a colloid mill (O. Krieger CH-4132 Muttenz Maschinen and Metalbau AG) by circulating with the widest gap for 2 minutes. The gap size was gradually decreased to the smallest position possible and allowed to circulate for additional 10 minutes. Finally the dry weight (10.7 wt %) of the puree was determined using a balance (microwave dry weight measurement P60 T110, CEM SMART Turbo). The amount of insoluble fiber fraction (1.03 wt %) was assumed using literature data (P. Ramulu and P. Udayasekhara Rao, Journal of Food Composition and Analysis 16 (2003) 677-685). The pH of this mango puree was 4.51. For preparation of milk tea products the pH of the puree was increased to 7.00 using 1M KOH.

Preparation of Source of Cellulose Microfibrils from Nata De Coco

Bacterial cellulose (BC) fibers were obtained by washing and cutting commercially available Nata de Coco (Nata De Coco "mango-flavor" was obtained from Sari Kelapa Murui). 32 bottles of Nata De Coco were used and divided in two batches for washing with water. The content of the bottles was put into a sieve to remove the syrup. Next, Nata De Coco pieces were put into a 3 L beaker. 1000 ml of demineralized water was added to the blender. Pieces were milled for 4 minutes using a kitchen hand blender (Braun 300 W household type 418554). Obtained suspension was filtrated over a bühner funnel using an S&S Whatman 113 paper filter. Care was taken not to remove all the liquid from the fiber. If fibers are dry removal and rehydration becomes more difficult. Fiber suspension was removed from the filter. 1000 mL of demineralized water was added. Suspension was mixed using a hand blender for 1 minute. Next suspension was filtered again over the bühner funnel. This was repeated 7 times in order to remove all the sugars and especially the color. Finally a white suspension was obtained. Product was stored at 5 degrees Celsius. Fiber content of the obtained slurry (6.17%) was measured by drying overnight in a vacuum oven at 40 degrees Celsius and 35 mbar.

Next the resulting dispersion was processed at the same temperature using a Microfluidizer™ high pressure homogenizer (M 110S, ex. Microfluidics). The following processing parameters were used: 1200 bar, Z-chamber of 87 micrometer, one homogenization pass, no cooling. The self suspending capacity of the resulting material at 0.3 wt % was 100%.

Preparation of RTD Milk Tea Beverages

RTD milk tea beverages with a composition according to Tables 4 to 8 were made according to the following methods. 'DC' indicates defibrillated cellulose.

TABLE 4

Milk tea powder composition

| Ingredient | % |
| --- | --- |
| Sugar | 61.43 |
| Non-dairy Creamer (14.80% sugar, milk protein 46%, fat 32.00%) | 17.36 |
| Milk protein | 15.57 |
| Hydrocolloids | 2.229 |
| Flow aiding agent | 0.257 |
| Black Tea Powder | 2.571 |
| Flavor | 0.583 |
| TOTAL | 100.00 |

TABLE 5 composition of examples 1 to 5 (wt %)

|  | 1 | 1a | 2 | 3 | 4 | 5 |
| --- | --- | --- | --- | --- | --- | --- |
| Milk tea powder | 10.43 | 10.43 | 10.43 | 10.43 | 10.43 | 10.43 |
| DC Citrus fiber | 0.18 | — | — | — | — | — |
| DC Citrus fiber (separate act.) | — | 0.34 | — | — | — | — |
| DC Tomato fiber | — | — | 0.20 | — | — | — |
| DC Mango fibre | — | — | — | 0.20 | — | — |
| DC Sugar cane fiber | — | — | — | — | 0.09 | 0.18 |
| Demineralized water | 89.39 | 89.37 | 89.39 | 89.39 | 89.48 | 89.39 |
| pH | 6.9 | 6.9 | 6.9 | 6.9 | 6.9 | 6.9 |

TABLE 6 composition of comparative examples A to F (wt %)

|  | A | B | C | D | E | F |
| --- | --- | --- | --- | --- | --- | --- |
| Milk tea powder | 10.43 | 10.43 | 10.43 | 10.43 | 10.43 | 10.43 |
| DC Wood fiber | — | 0.09 | — | — | — | — |
| DC Bacterial cellulose fiber | — | — | 0.09 | 0.18 | — | — |
| Citrus fiber | — | — | — | — | 0.18 | — |
| Mango fiber | — | — | — | — | — | 0.20 |
| Demineralized water | 89.57 | 89.48 | 89.48 | 89.39 | 89.39 | 89.37 |
| pH | 6.9 | 6.9 | 6.9 | 6.9 | 6.9 | 6.9 |

TABLE 7 composition of examples 6 to 8 and comparative examples G and H (wt %)

|  | 6 | 6a | 7 | G | H |
| --- | --- | --- | --- | --- | --- |
| Milk tea powder | 10.40 | 10.40 | 10.40 | 10.40 | 10.40 |
| DC Citrus fiber | 0.45 | — | — | — | — |
| DC Citrus fiber (separate act.) | — | 0.83 | — | — | — |
| Citrus fiber | — | — | — | 0.45 | — |
| DC Mango fiber | — | — | 0.5 | — | — |
| Mango fiber | — | — | — | — | 0.5 |
| Demineralized water | 89.15 | 89.10 | 89.15 | 89.15 | 89.15 |
| pH | 6.9 | 6.9 | 6.9 | 6.9 | 6.9 |

TABLE 8 composition of examples 8 to 9 and comparative examples I and J (wt %)

|  | 8 | 9 | I | J |
| --- | --- | --- | --- | --- |
| Milk tea powder | 10.43 | 10.40 | 10.43 | 10.40 |
| DC Mango puree | 0.18 | 0.45 | — | — |
| Mango puree | — | — | 0.18 | 0.45 |
| Demineralized water | 89.39 | 89.10 | 89.39 | 89.15 |
| pH | 6.9 | 6.9 | 6.9 | 6.9 |

TABLE 9 composition of examples 10 to 12 (wt %)

|  | 10 | 11 | 12 |
| --- | --- | --- | --- |
| Milk tea powder | 10.45 | 10.45 | 10.45 |
| DC Citrus fibre | 0.27 | — | — |
| DC Bacterial cellulose fiber | — | 0.27 | — |
| DC Wood fiber-2 | — | — | 0.27 |
| Demineralized water | 89.28 | 89.28 | 89.28 |
| pH | 6.9 | 6.9 | 6.9 |

Preparation Via Direct Defibrillation Route (Samples 1-9)

A source of cellulose microfibrils from a primary cell wall material and water at 80 degrees Celsius were combined and subsequently mixed in an overhead mixer (Silverton L4RT-A, work head (small screen) with small holes (1 mm diameter)) at a speed of 3000 rpm for 5 minutes. Next milk tea powder (Unilever Milk tea Original), see Table 4, was added to the fibre dispersion and stirred using the Silverson for an additional 2 to 3 minutes until the powder is nicely dispersed. The resulting dispersion was processed hot (at the same temperature) using a Microfluidizer™ high-pressure homogenizer (M 110S, ex. Microfluidics). The following processing parameters were used: 1200 bar, Z-chamber of 87 micrometer, one homogenization pass, no cooling. The resulting beverage was hot filled in plastic bottles. Bottles were inverted and allowed to stand for 10 minutes at room temperature. Next bottles were cooled to 5 degrees Celsius using ice water. Products were finally stored at 5 degrees Celsius. The exact compositions of samples 1-9 and comparative examples A-J are given in Tables 5 to 8.

Preparation Via Separate Defibrillation Route (Samples 1a and 6a)

For sample 1a 28.06 grams of the prepared 2 wt % defibrillated primary cell wall material concentrate from Citrus Fibre AQ+N was added to 121.94 grams of water. The mixture was mixed using a Silverson stirrer (small screen) at 4000 rpm for 5 minutes. Next the mixture was heated to 95 degrees Celsius using a microwave. 17.5 grams of commercially available milk tea powder (Unilever Milk Tea Original), see Table 4, was added to the mixture using a Silverson stirrer (small screen) at 4000 rpm for 2 to 3 minutes until the powder was well dispersed. Product was hot filled in 330 ml hot fill bottles (filling temp. was approximately 85 degrees Celsius). Bottles were inverted and allowed to stand for 10 minutes at room temperature. Next bottles were cooled to 5 degrees Celsius using ice water. Products were finally stored at 5 degrees Celsius.

Preparation of a 2 wt % Defibrillated Primary Cell Wall Material Concentrate 20 grams of Citrus Fiber AQ+N were added to 980 grams of boiling water (taken from a Quooker) using Silverson stirring (small screen) at 4000 rpm. The mixture was stirred an additional 5 minutes at 4000 rpm. Next the suspensions was processed using the Microfluidizer M110S (no cooling) at 1200 bar using a G10Z chamber. Product was directly hot filled in 330 ml hot fill bottles (filling temp. was approximately 85 degrees Celsius). Bottles were inverted and allowed to stand for 10 minutes at room temperature. Next bottles were cooled to 5° C. using ice water. Products were finally stored at 5 degrees Celsius.

Preparation of Reference Samples A-J

A source of cellulose microfibrils from a primary cell wall material and water at 80 degrees Celsius were combined and subsequently mixed in an overhead mixer (Silverton L4RT-A, work head (small screen) with small holes (1 mm diameter)) at a speed of 3000 rpm for 5 minutes. Next milk tea powder (Unilever Milk tea Original), see Table 4, was added to the fiber dispersion and stirred using the Silverson for an additional 2 to 3 minutes until the powder is nicely dispersed. The exact compositions of the comparative examples A-J are given in Tables 6, 7 and 8.

Preparation of Milk Tea Samples for Direct Sensory Comparison (Samples 10-12)

Demineralised water was used at room temperature. Citrus fibre, Bacterial cellulose, Wood pulp fibre 2 were added under stirring using a Silverson at 3500 rpm for 10 minutes (using small grid, with 1 mm diameter holes) to a fibre concentration of 0.3 wt %. Dispersions were run (one pass) over the Microfluidizer M,-110S using a G10Z chamber at 1200 bar. Hot water was run over the microfluidizer to pasteurize the machine. Water bath microfluidizer was not cooled (no water in bath). Obtained fibre dispersions were directly used for the preparation of milk tea products.

Obtained dispersion was heated in a microwave to 90° C. Mixture was stirred using a Silverson stirrer for 1 minute at 2000 rpm (using the small grid). Next milk tea powder (Unilever Milk Tea Original) was added (1 sachet per 150 ml of fibre dispersion) using Silverson string. After dispersing the powder, the mixture was stirred for an additional 1 minute at 2000 rpm. Products were filled in a bottle that was cooled to 5° C. by placing it in an ice water bath. Next bottle was stored at 5° C. until it was used in the creaminess evaluation test, rheology measurements and stability evaluation.

Results

The prepared beverages were assessed on 'creamy mouthfeel' by tasting, as described above. The stability of the beverages was determined using the accelerated stability test described above. Product appearance was evaluated by eye. Samples that are inhomogeneous or have large visible sediment are considered unstable. The results are given in Table 10.

The results show that the milk tea beverage comprising microfibrillated cellulose obtained from primary cell wall material (according to the invention) has a creamy mouthfeel and are more stable than the milk tea beverages comprising either cellulose microfibrils obtained from secondary cell wall material or bacterial cellulose.

The results show that the milk tea beverage comprising microfibrillated cellulose obtained from primary cell wall material (according to the invention) has a significantly creamier mouthfeel than the milk tea beverages comprising either cellulose microfibrils obtained from secondary cell wall material or bacterial cellulose.

TABLE 10

Results

| (Comparative) example | Creamy mouthfeel | Stability (Y/N) # Sediment (g/ml) ## | G'(Pa) at 5 min (20° C.) |
|---|---|---|---|
| 1 | creamier than A | Y (1.76) | 10.7 ± 2.0 |
| 1a | — | Y, No visual sediment | 4.8 ± 0.1 |
| 2 | creamier than A | Y, (0.2) | 13.6 ± 5.0 |
| 3 | creamier than A | Y (0.0) | 0.83 ± 0.2 |
| 4 | — | Y (0.86) | 2.9 ± 3.2 |
| 5 | — | Y (1.14) | 0.53 ± 0.15 |
| 6 | — | Y, No visual sediment | 27.1 ± 6.3 |
| 6a | — | Y, No visual sediment | 56.0 ± 0.1 (35° C.) |
| 7 | creamier than A | Y, No visual sediment | — |
| 8 | — | Y (0.86) | 32.9 ± 3.2 |
| 9 | — | Y (0.0) | 45.8 ± 11.9 |
| 10 | — | Y (**0.0 mm) | 5.17 ± 0.2 |
| 11 | Less creamy than 10 | N (**8 mm) | 21.67 ± 0.65 |
| 12 | Less creamy than 10 | N (**11 mm) | 12.46 ± 0.4 |
| A | reference | Reference, No visual sediment | — |
| B | creamier than A | N (6.17) | 1.5 ± 0.5 |
| C | creamier than A | N (2.38) | 4.9 ± 1.0 |
| D | creamier than A | N (4.45) | 11.4 ± 1.2 |
| E | not creamier than A | N (2.48) | 3.2 ± 0.2 |
| F | not creamier than A | N (**3.8 ml) | n.d. |
| G | creamier than A | N (7.53) | n.d. |
| H | creamier than A | N (**10.4 ml) | n.d |

TABLE 10-continued

| (Comparative) example | Creamy mouthfeel | Stability (Y/N) # Sediment (g/ml) ## | G'(Pa) at 5 min (20° C.). |
|---|---|---|---|
| I | — | N, Not homogeneous | n.d |
| J | — | N, Phase separation | n.d. |

* n.d.—not determined;
using the 2000 rpm protocol;
using the 4000 rpm protocol
**sediment is given as volume.

The invention claimed is:

1. Ready-to-drink tea beverage comprising water, tea solids, protein and primary cell wall material comprising cellulose microfibrils; wherein the primary cell wall material is sourced from plant parenchymal tissue, and wherein
the beverage has a pH of 5 to 7.5;
at least part of the protein is milk protein;
the primary cell wall material comprises partially disentangled defibrillated cell wall material;
the cellulose microfibrils have an average degree of crystallinity of less than 50%;
at least 80 wt % of the cellulose microfibrils is smaller than 50 nm in diameter;
the defibrillated cell wall material has a self-suspending capacity from 50 to 100%;
wherein the amount of the primary cell wall material is from 0.01 to 2 wt %; and
the beverage has an elastic modulus from 0.01 Pa to 10 kPa at 20 degrees Celsius.

2. The beverage according to claim 1 wherein the amount of primary cell wall material is from 0.05 to 0.8 wt %.

3. The beverage according to claim 1 wherein the average degree of crystallinity of the cellulose microfibrils is less than 40%.

4. The beverage according to claim 1 wherein at least 80 wt % of the cellulose microfibrils is smaller than 40 nm in diameter.

5. The beverage according to claim 1 wherein the defibrillated cell wall material has a self-suspending capacity from 80 to 100%.

6. The beverage according to claim 1 wherein the amount of protein is from 0.1 to 10 wt %.

7. The beverage according to claim 1 wherein the protein comprises at least 50 wt % milk protein.

8. The beverage according to claim 1 wherein the amount of tea solids is at least 0.01 wt %.

9. The beverage according to claim 1 further comprising fat in an amount from 0 to 20 wt %.

10. The beverage according to claim 1 further comprising from 0.005 to 1 wt % hydrocolloid.

11. The beverage according to claim 1 further comprising from 0.01 to 6 wt % sweetener selected from sucrose, lactose, glucose, fructose and combinations thereof.

12. The beverage according to claim 1 having an elastic modulus at 20 degrees Celsius from 0.01 Pa to 10 kPa.

13. The beverage according to claim 2, wherein the amount of primary cell wall material is from 0.1 to 0.7 wt %.

14. The beverage according to claim 3, wherein the average degree of crystallinity of the cellulose microfibrils is less than 30%.

15. The beverage according to claim 4, wherein at least 80 wt % of the cellulose microfibrils is smaller than 10 nm in diameter.

16. The beverage according to claim 5, wherein at least wherein the defibrillated cell wall material has the self-suspending capacity from 80 to 100%.

17. The beverage according to claim 1, wherein the source of primary cell wall material is selected from parenchymal tissue from fruits, roots, bulbs, tubers, seeds and combinations thereof.

18. The beverage according to claim 1, wherein the tea solids are selected from black tea, green tea and combinations thereof.

* * * * *